(12) United States Patent
Miserque et al.

(10) Patent No.: US 7,847,042 B2
(45) Date of Patent: Dec. 7, 2010

(54) SLURRY POLYMERISATION PROCESS OF ETHYLENE IN THE PRESENCE OF LOW AMOUNT OF SCAVENGER

(75) Inventors: Olivier Miserque, Mont-Saint-Guibert (BE); Martine Slawinski, Nivelles (BE); Daniel Siraux, Naast (BE); Alain Brusselle, Wilrijk (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/295,253

(22) PCT Filed: Mar. 29, 2007

(86) PCT No.: PCT/EP2007/053044

§ 371 (c)(1),
(2), (4) Date: Mar. 27, 2009

(87) PCT Pub. No.: WO2007/113213

PCT Pub. Date: Oct. 11, 2007

(65) Prior Publication Data

US 2009/0318638 A1    Dec. 24, 2009

(30) Foreign Application Priority Data

Mar. 30, 2006  (EP) .................... 06112030
Sep. 29, 2006  (EP) .................... 06121494

(51) Int. Cl.
C08F 2/00       (2006.01)
C08F 4/52       (2006.01)
C08F 4/00       (2006.01)
C08F 110/02     (2006.01)

(52) U.S. Cl. .................... 526/185; 526/64; 526/86; 526/90; 526/352

(58) Field of Classification Search ................ 526/352, 526/64, 86, 90
See application file for complete search history.

(56) References Cited

U.S. PATENT DOCUMENTS

| 5,891,814 | A  | * | 4/1999 | Richeson et al. ............ 442/401 |
| 2005/0070675 | A1 |   | 3/2005 | Wang |
| 2005/0153830 | A1 | * | 7/2005 | Jensen et al. ................ 502/117 |

FOREIGN PATENT DOCUMENTS

| EP | 1195388 A | 4/2002 |
| WO | WO/0132757 A | 5/2001 |

* cited by examiner

*Primary Examiner*—David Wu
*Assistant Examiner*—Elizabeth Eng
(74) *Attorney, Agent, or Firm*—Tenley R. Krueger

(57) ABSTRACT

The invention discloses a metallocene catalysed slurry polymerisation process of ethylene in the presence of a low concentration of scavenger. This allows improving the anti-sheeting of the reactor during the polymerisation process.

2 Claims, No Drawings

SLURRY POLYMERISATION PROCESS OF ETHYLENE IN THE PRESENCE OF LOW AMOUNT OF SCAVENGER

CROSS-REFERENCE TO RELATED APPLICATIONS

This application claims the benefit of PCT/EP2007/053044, filed Mar. 29, 2007, which claims the benefit of European Patent Application 06112030.9, filed on Mar. 30, 2006 and European Patent Application 06121494.6, Sep. 29, 2006.

The present invention concerns an ethylene polymerisation process using a metallocene-type catalyst.

Olefin polymerisation processes are well known. Among the processes, slurry polymerisation in suspension in a solvent is extensively practiced. In such polymerisation process, monomer, diluent, catalyst, co-catalyst and optionally comonomer and hydrogen are fed to a reactor where the monomer is polymerised. A component acting as a scavenger of water, oxygen and other impurities, which may be present in the polymerisation medium, is usually added to the reactor. The diluent does not react but is typically used to control solids concentration. Such polymerisation process is typically performed in a stirred tank reactor, or in a loop reactor. One or more reactors can be used. In such process, solid polymer particles are grown on small catalyst particles. The released heat of polymerisation is eliminated through cooling of the reactor walls.

When metallocene type catalyst is used in the polymerisation process, it has been found that on an industrial scale whereas the polymer particles are insoluble or substantially insoluble in the diluent, the polymer product has some tendency to deposit on the walls of the polymerisation reactor. This so-called "sheeting" leads to a decrease in the efficiency of heat exchange between the reactor bulk and the coolant around the reactor. This leads in some cases to an overheating of the reactor, which may cause the loss of the reactor control forcing the shutdown of the reactor for cleaning.

Attempts to avoid build-up of polymer on the walls of the polymerisation reactor during slurry polymerisation have been made by adding an anti-fouling agent in the polymerisation medium. Typically, the anti-fouling agent acts for example to make the medium more conductive, thus preventing to some extent the formation of electrostatic charges, which is one of the causes of the build-up of polymer on the walls of the reactor.

However, there have been some problems associated with such agents such as e.g. an increase of catalyst consumption due to a loss of activity in the presence of the anti-fouling agent, even at the low levels typically used in the polymerisation processes.

EP 0 781 300 relates to a continuous process for the polymerisation of one or more olefins utilising a metallocene catalyst or catalyst system in a continuous slurry or gas phase polymerisation process. The invention is more particularly drawn to a gas phase polymerisation process for polymerising one or more olefins in the presence of a metallocene catalyst system in a fluidized bed reactor in the absence of or with a low amount of a scavenger. A batch slurry polymerisation is only exemplified in the presence of triethylaluminium used as scavenger. The document however fails to teach how to avoid the fouling in a slurry polymerisation process.

US 2005/0153830 relates to olefin polymerisation catalyst compositions and methods for the polymerisation and copolymerisation of olefins, including polymerisation methods using a supported catalyst composition. This document also relates to a catalyst composition comprising the contact product of a first metallocene compound, a second metallocene compound, at least one chemically-treated solid oxide, and at least one organaluminium compound.

U.S. Pat. No. 5,891,814 discloses slurry or gas phase polymerisation process of propylene or ethylene with a catalyst system comprising two metallocenes. The catalyst system may be combined with one or more additives such as scavengers. Among scavengers, triethylaluminium, trimethylaluminium, tri-isobutylaluminium and tri-n-hexylaluminium are cited.

US 2005/0070675 relates to polymerisation of ethylene and optional comonomers using a supported metallocene catalyst, an alumoxane activator and triisobutylaluminium.

It is an object of the present invention to provide a process for reducing the amount of sheeting which occurs in the reactor during the slurry polymerisation of ethylene utilising a metallocene type catalyst.

It is another object of the present invention to provide a polymerisation process of ethylene with a good productivity.

At least one of the above objects is at least partially achieved by the invention.

In the present invention, the sheeting of the reactor is evaluated by measuring the thermal conductibility of the reactor walls. When sheeting increases on the reactor walls, the thermal conductibility decreases.

The present inventors have found a process for producing polyethylene that at least partly solve the problems encountered in the prior art, the process comprising polymerising ethylene alone or in combination with one or more alpha-olefinic comonomers in the presence of a supported metallocene catalyst, a polymerisation diluent, and a scavenger represented by the formula $AlR_x$ wherein each R is the same or different and is an alkyl group, said alkyl group having from 3 to 8 carbon atoms, and x is 3, said scavenger being introduced in an amount of from 5 to 40 ppm by weight based on the total amount of the diluent and reactants present.

In the present invention, reactants are ethylene, supported metallocene catalyst, scavenger, alpha-olefinic comonomers and hydrogen; and the diluent is an inert polymerisation diluent, such as e.g. isobutane.

Preferably, the scavengers are alkyl aluminiums, more preferably trialkyl aluminiums such as but not limited to tri-n-propylaluminium, tri-isopropylaluminium, tri-n-butylaluminium, triisobutylaluminium, tri-n-pentylaluminium, tri-n-hexylaluminium, tri-n-octylaluminium. The most preferred trialkylaluminium scavenger is the triisobutylaluminium (TIBAL).

Preferably, the scavenger is introduced in an amount of from 5, 10 or 15 ppm by weight up to 20, 25, 30, 35 or 40 ppm by weight based on the total amount of diluent and reactants present.

Alternatively, the amount of scavenger introduced may be expressed in grams per ton of the total diluent and reactants. According to this alternative, the scavenger is introduced in an amount of from 5 g/ton to 40 g/ton based on the total amount of diluent and reactants present.

However expressed, this is most easily obtained in a continuous process by introducing 5 to 40 ppm (or g/ton) of scavenger in the diluent and reactants fed to the reactor.

Preferably, the scavenger is introduced in an amount of from 5, 10 or 15 g/ton up to 20, 25, 30, 35 or 40 g/ton based on the total amount of diluent and reactants present.

Without being wishing to be bound by a theory, it is believed that the sheeting of the reactor may be explained as follows. At the exit of the reactor, the polymer slurry and the scavenger are taken from the reactor to a flash tank through a flash line that is heated with steam. This water in the flash line reacts with the scavenger for forming undesired reaction products leading to the formation of e.g. isobutylaluminoxane when TIBAL is used as scavenger. Isobutylaluminoxane is sufficiently soluble to serve as an effective reagent to remove the metallocene from its support leading to a homogeneous metallocene active site, which polymerises the ethylene anywhere in the reaction medium even on the reactor walls, thus leading to the sheeting of the reactor.

It has been surprisingly found by the present inventors that by using the scavengers selected in the present invention in the amount described hereabove, sheeting of the reactor walls is significantly reduced or even essentially avoided while keeping the catalyst productivity and the resin properties similar to those obtained by an equivalent polymerisation process wherein usual amounts of scavenger comprised between 60 and 100 ppm by weight based on the total amount of diluent and reactants are used. This was not found to be obtainable by using other scavengers than those selected in the present invention.

Another advantage of the process of the invention relies on the fact that even if the scavenger amount is significantly reduced, small variations of the scavenger concentration do not affect the properties of the final resin produced and the catalyst productivity.

Our invention differs from the prior art EP 0 781 300 by a selection on slurry polymerisation process, which occurs in the presence of specific scavengers present in well defined quantity. This allows getting a good catalyst activity, which is not always observed when triethylaluminium is used. EP 0 781 300 does not suggest to a skilled person that by selecting the scavenger as in the present invention, a similar or even better catalyst activity is obtained. Indeed, it has been observed that the present scavengers used with the metallocene catalyst described in the invention lead to a more stable catalyst activity than when triethylaluminium is used.

In the present invention, the polyethylene is a homopolymer or a copolymer of ethylene with an alpha-olefinic comonomer selected from the group consisting of propylene, 1-butene, 1-hexene, 1-octene, 4-methyl-1-pentene and mixtures thereof, the preferred comonomer being 1-hexene. The invention is preferably applied to the copolymerisation of ethylene.

The metallocene catalyst used in the process of the invention has the general formula:

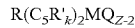

wherein $(C_5R'_k)$ is a cyclopentadienyl or substituted cyclopentadienyl, each R' being the same or different and is hydrogen or a hydrocarbyl radical such as alkyl, alkenyl, aryl or arylalkyl radical containing from 1 to 20 carbon atoms or two carbon atoms joined together to form a $C_4$-$C_6$ ring, R is a substituted or. unsubstituted $C_1$-$C_4$ alkylidene radical, a dialkyl germanium or a dialkyl silicon or a di-aloxysilane, or an alkyl phosphine or amine radical bridging two $(C_5R'_k)_2$ such as defined hereabove, Q is a hydrocarbyl radical such as aryl, alkyl, alkenyl, alkylaryl, or aryl alkyl radical having from 1-20 carbon atoms, hydrocarboxy radical having 1-20 carbon atoms or halogen and can be the same or different from each other, Z is the valence of the transition metal and M is a group IVb, Vb or VIb transition metal, Preferably, $(C_5R'_k)$ is a tetra hydrogenated indenyl group. More preferably, $(C_5R'_k)$ is an unsubstituted tetra hydrogenated indenyl group.

Preferably, M is a group IVb transition metal, more preferably M is zirconium.

Preferably, Q is an alkyl having from 1-4 carbon atoms or an alkyl having 6 carbon atoms or a halogen, more preferably Q is methyl or chlorine.

Preferably, R is a substituted or unsubstituted $C_1$-$C_4$ alkylidene radical, more preferably ethylene or isopropylidene.

Preferably, the invention is particularly applicable to a bridged bis(tetrahydroindenyl)zirconium dichloride, more preferably an ethylene bis(tetrahydroindenyl)zirconium dichloride.

The metallocene catalyst can be activated and is supported according to any known method.

The polymerisation of ethylene in the present invention occurs in slurry phase. Slurry processes generally include forming a suspension of solid particulate polymer in a liquid polymerisation diluent. The diluent employed should be inert as well as liquid under the conditions of polymersation. Typical polymerisation diluents include hydrocarbons with 4 to 7 carbon atoms such as e.g. isobutane or hexane. Preferably, isobutane is used.

The polymerisation may take place in a single stirred reactor or in a single loop reactor.

Preferably, the polymerisation takes place in two stirred reactors or in two slurry loop reactors, which can be used in parallel or in series. Preferably, the reactors are loop reactors connected in series.

The polymerisation may be performed in the range of from 60° C. to 110° C., preferably from 70° C. to 100° C. and at a pressure of from 20 to 60 bars.

The polymerisation may be performed in the presence of hydrogen.

According to one embodiment, the invention is directed to a slurry phase process wherein ethylene, polymerisation diluent, supported metallocene catalyst, scavenger, optionally comonomers and optionally hydrogen are fed to one reactor.

According to another embodiment, the invention is directed to a slurry phase process in two loop reactors connected in series wherein ethylene, polymerisation diluent, supported metallocene catalyst, scavenger, optionally comonomers and optionally hydrogen are fed to a first reactor, the amount of scavenger added to the first reactor being in the range such as disclosed here above and wherein additional ethylene, additional polymerisation diluent, additional scavenger, optionally additional comonomers, optionally additional supported metallocene catalyst and optionally additional hydrogen are fed to a second reactor, the amount of the additional scavenger introduced into the second reactor being in the range of from 5 to 40 ppm by weight based on the additional diluent and additional reactants introduced into the second reactor.

Preferably, comonomer is added to the first reactor. Preferably, additional comonomer is added to the second reactor. Preferably, there is no additional supported metallocene catalyst introduced into the second reactor.

Preferably, the additional amount of scavenger introduced into the second reactor ranges from 5, 10 or 15 ppm by weight up to 20, 25, 30, 35 or 40 ppm by weight based on the additional diluent and additional reactants introduced into the second reactor. At any given time of the process, the amount of scavenger is between 5 to 40 ppm, based on the total amount of the diluent and reactants present. This is most easily obtained in a continuous process by introducing 5 to 40 ppm of scavenger in the diluent and reactants fed to each reactor.

Preferably, the additional amount of scavenger introduced into the second reactor is equal to or lower than the amount of scavenger introduced to the first reactor. Preferably, the additional amount of scavenger introduced into the second reactor is from 40 to 70 percent of the amount of scavenger introduced into the first reactor.

Still according to another embodiment, the diluent is recycled into the process. In this case, the scavenger is first neutralised with an aqueous solution before recycling the polymerisation diluent into the reactor. The aqueous solution is preferably water such as steam.

For the neutralisation of the scavenger, a mole ratio of water to the scavenger of from 3, 10, 20 or 30 up to 50, 60, 100, 150 or 300 is used.

The present inventors have surprisingly found that by controlling, in a industrial polymerisation process, on the one hand the amount of the scavenger introduced into the reactor and on the other hand the quantity of aqueous solution necessary to neutralise the scavenger before the polymerisation diluent is recycled into the process, a reduction of sheeting of the reactor walls is achieved.

It is believed that controlling the amount of water used to neutralise the scavenger limits the unavoidable presence of small amounts of water, which typically is not completely separated in the recycle purification system and which is thus further recycled to the reactor wherein it may react with the scavenger forming undesired reaction products leading to the formation of e.g. isobutylaluminoxane when TIBAL is used as scavenger. Isobutylaluminoxane is sufficiently soluble to serve as an effective reagent to remove the metallocene from its support leading to a homogeneous metallocene active site, which polymerises the ethylene anywhere in the reaction medium even on the reactor walls, thus leading to the sheeting of the reactor.

The invention further provides the use of a scavenger represented by the. formula $AlR_x$ wherein each R is the same or different and is an alkyl group, said alkyl group having from 3 to 8 carbon atoms; and x is 3 in a slurry process for producing polyethylene, the process comprising polymerising ethylene alone or in combination with one or more alpha-olefinic comonomers in the presence of a supported metallocene catalyst, a polymerisation diluent and optionally hydrogen, said scavenger being present in an amount of from 5 to 40 ppm by weight based on the total amount of diluent and reactants present.

EXAMPLE 1 AND COMPARATIVE EXAMPLE

The polymerisations were carried out in a liquid-full slurry loop reactor in the presence of ethylene, hexene, hydrogen, triisobutylaluminium, isobutane and metallocene catalyst. The metallocene catalyst was an activated and supported ethylene bis(4,5,6,7,tetrahydro-1-indenyl)zirconium dichloride.

The comparative example differs from the example essentially by the TIBAL content. The polymerisation conditions are indicated in table 1.

TABLE 1

|  | Example | Comparative |
|---|---|---|
| C2 feed (ton/h) | 5.2 | 4.8 |
| C6 feed (kg/h) | 129.2 | 120.0 |
| Hydrogen (g/h) | 215.0 | 207.0 |
| i-C4 feed (ton/h) | 2.8 | 2.5 |
| TIBAL, 10% by weight solution in hexane (kg solution/h) | 0.6 | 5.0 |
| Catalyst injected (kg/h) | 0.52 | 0.48 |
| C6/C2 feed ratio (kg/ton) | 24.8 | 25 |
| H2/C2 feed ratio (g/ton) | 41.3 | 43.1 |
| Temperature of polymerisation (° C.) | 90 | 90 |
| Catalyst productivity (g PE/g cat) | 10000 | 10000 |

C2 = ethylene
C6 = 1-hexene
i-C4 = isobutane
TIBAL = triisobutylaluminium was added as a ten percent by weight solution in hexane. The solution was introduced at a rate of 0.6 kg/h in the example and at a rate of 5.0 kg/h in the comparative example.

During the polymerisation, fouling occurred on the walls of the reactor in the comparative example. This was not the case in the example.

EXAMPLE 2

A polymerisation was carried out in two liquid-full slurry loop reactors connected in series in the presence of ethylene, hexene, hydrogen, tri-isobutylaluminium, isobutane and metallocene catalyst. The metallocene catalyst was an activated and supported ethylene bis(4,5,6,7,tetrahydro-1-indenyl)zirconium dichloride. Ethylene, hexane, hydrogen, isobutane, triisobutylaluminium and catalyst were introduced into reactor 1 in quantities such as mentioned in table 2. Additional ethylene, additional hexene, additional hydrogen, additional isobutane and additional triisobutylaluminium were added to reactor 2 in quantities such as mentioned in table 2. Additional catalyst was not introduced into reactor 2.

TABLE 2

|  | Reactor 1 | Reactor 2 |
|---|---|---|
| C2 feed (ton/h) | 5.31 | 5.38 |
| C6 feed (kg/h) | 195.7 | 252 |
| Hydrogen (g/h) | 218.0 | 202.0 |
| i-C4 feed (ton/h) | 3.284 | 2.416 |
| TIBAL, 10% by weight solution in hexane (kg solution/h) | 1.14 | 0.49 |
| Catalyst injected (kg/h) | 0.83 | 0.0 |
| C6/C2 feed ratio (kg/ton) | 36.86 | 46.9 |
| H2/C2 feed ratio (g/ton) | 41.01 | 43.1 |
| Temperature of polymerisation (° C.) | 90 | 90 |

The polymerisation took place during 8 days. No fouling occurred neither in reactor 1 nor in reactor 2.

The invention claimed is:

1. A slurry process for producing polyethylene in two loop reactors comprising:
   polymerising ethylene alone or in combination with one or more alpha-olefinic comonomers in the presence of a supported metallocene catalyst, a polymerisation diluent. and a scavenger represented by the formula $AlR_x$ wherein each R is the same or different and is an alkyl group having from 3 to 8 carbon atoms, and x is 3, said scavenger being introduced in an amount of 5 to 40 ppm by weight based on the total amount of the diluent and reactants introduced to a first reactor; and
   additional ethylene, polymerisation diluent, and scavenger are introduced into the second reactor, the amount of the additional scavenger introduced into the second reactor being in the range of from 5 to 40 ppm by weight based on the additional diluent and additional reactants introduced into the second reactor.

2. The process of claim 1, wherein the scavenger comprises triisobutylaluminium.

* * * * *